(12) United States Patent  
Besse et al.

(10) Patent No.: US 11,691,716 B2  
(45) Date of Patent: Jul. 4, 2023

(54) PROPULSION SYSTEM FOR AN AIRCRAFT

(71) Applicant: SAFRAN, Paris (FR)

(72) Inventors: Jean-Louis Robert Guy Besse, Moissy-Cramayel (FR); Ye-Bonne Karina Maldonado, Moissy-Cramayel (FR)

(73) Assignee: SAFRAN, Paris (FR)

( * ) Notice: Subject to any disclaimer, the term of this patent is extended or adjusted under 35 U.S.C. 154(b) by 659 days.

(21) Appl. No.: 16/845,319

(22) Filed: Apr. 10, 2020

(65) Prior Publication Data

US 2020/0324875 A1  Oct. 15, 2020

(30) Foreign Application Priority Data

Apr. 10, 2019 (FR) ..................................... 1903834

(51) Int. Cl.
```
B64D 27/02      (2006.01)
B64D 29/00      (2006.01)
B64C 29/00      (2006.01)
B64C 11/00      (2006.01)
B64C 7/02       (2006.01)
```

(52) U.S. Cl.
CPC .............. B64C 11/001 (2013.01); B64C 7/02 (2013.01); B64C 29/0033 (2013.01)

(58) Field of Classification Search
None
See application file for complete search history.

(56) References Cited

U.S. PATENT DOCUMENTS

| | | |
|---|---|---|
| 2,651,172 A | 9/1953 | Kennedy |
| 7,458,221 B1 | 12/2008 | Arnold et al. |
| 2012/0073262 A1 | 3/2012 | Bulin et al. |

FOREIGN PATENT DOCUMENTS

| | | |
|---|---|---|
| EP | 2336022 A2 | 6/2011 |
| EP | 2433864 A1 | 3/2012 |
| EP | 2730773 A2 | 5/2014 |
| GB | 2372779 A | 9/2002 |
| WO | 2008/045081 A1 | 4/2008 |

OTHER PUBLICATIONS

Rapport de Recherche Préliminaire/Opinion Écrite, mailed Dec. 20, 2019, issued in corresponding French Application No. 1903834, filed Apr. 10, 2019, 6 pages.

Primary Examiner — Timothy D Collins  
Assistant Examiner — Rodney M Henry  
(74) Attorney, Agent, or Firm — Christensen O'Connor Johnson Kindness PLLC

(57) ABSTRACT

A propulsion system for an aircraft, comprising at least one rotor and a nacelle fairing extending around the at least one rotor with respect to an axis of rotation of the rotor, the nacelle fairing comprising: an upstream section forming an inlet section of the nacelle fairing; a downstream section wherein a downstream end forms an outlet section of the nacelle fairing; and an intermediate section connecting the upstream and downstream sections, wherein the downstream section comprises a radially inner wall and a radially outer wall made of a deformable shape memory material, and further comprising at least one actuator mechanism with at least one cylinder configured to cooperate with one or more components, projections, etc., embedded in an inner surface of the radially outer wall so as to vary an outer diameter of the outlet section between a minimum diameter and a maximum diameter.

11 Claims, 8 Drawing Sheets

PROPULSION SYSTEM FOR AN AIRCRAFT

TECHNICAL FIELD

Embodiments of the present disclosure concern the field of propulsion systems for aircraft. They relate in particular to a propulsion system with a variable section nacelle fairing profile.

BACKGROUND

An aircraft propulsion system comprises, for example, at least one rotor or propeller having a plurality of blades mounted on a rotating shaft.

There are aircraft, including Vertical Take-Off and Landing Aircraft (VTOL), with single-rotor propulsion systems when they comprise a single rotor or counter-rotating when they comprise rotors grouped in pairs rotating in opposite directions.

These propulsion systems are either with faired rotors (the rotor is then surrounded by an annular nacelle fairing) or with free rotors, the propulsion systems and in particular the rotors (free or faired) being able to be mounted on a pivot shaft allowing the orientation of the propulsion systems and therefore of the rotors between a vertical and a horizontal position, for example vertical orientation for a vertical take-off or landing and horizontal orientation for forward flight or aircraft mode.

Faired rotors have several interesting advantages, such as:

a significant reduction of the rotor's sound signature in direct emission;

a protection of the rotor blades against surrounding obstacles;

an improvement in rotor performance, especially when the aircraft is in hovering flight or at low forward speeds.

Faired nacelle provide the respective rotor with additional thrust in hovering flight (i.e. when the aircraft is stationary in the air, in suspension without support), during take-off or at low forward speed due to the effect of the faired nacelle on an air flow downstream of the rotor, with reference to the direction of flow of this air flow over the faired nacelle, also called a flow tube. More precisely, without the presence of the nacelle fairing, with a free rotor, the air flow downstream of the rotor has a natural inward contraction. In other words, the diameter of the flow tube decreases downstream until it reaches a diameter equal to half the rotor cross-section.

On the other hand, for a faired rotor, the outlet cross-section of the nacelle fairing defines the shape of the airflow tube, i.e. a cylindrical shape at the outlet of the nacelle fairing with a substantially constant cross-section, thus preventing its natural contraction.

The propulsion balance depends on the outlet cross-section of the nacelle fairing so that the larger the outlet cross-section of the nacelle fairing, the higher the propulsion balance. The thrust generated by the presence of the nacelle fairing is therefore generated at the leading edge of the nacelle fairing via a local depression due to the bypass of the nacelle fairing by the flowing airflow. The greater the flow of air admitted into the propulsion system, i.e. the greater the outlet cross-section of the nacelle fairing, the greater this depression and, consequently, the greater the thrust generated.

However, at high speed, the propulsion efficiency of a faired rotor is lower. Indeed, as the aircraft's forward speed increases, the performance of the faired rotor decreases due to the rapid increase in drag induced by the presence of the nacelle fairing. As a result, depending on the rotational speed and the size of the rotor, propulsion efficiency decreases.

Thus, with a faired rotor, masking of noise emission and safety around the rotor perimeter are favored at the expense of the propulsion efficiency when the aircraft is cruising, i.e. at high forward speeds.

Furthermore, depending on the aircraft's flight conditions, in particular during take-off, or when the aircraft is in vertical flight (or VTOL mode) hovering or at low speed close to and above a surface such as the ground, the direction of airflow around the aircraft and in particular around the nacelle fairing of the aircraft's propulsion systems varies. Indeed, under these conditions, the air flow projected downstream of the rotor impacts the surface located below the aircraft, which deflects its trajectory and changes the direction of the air flow around the aerodynamic profile constituting the nacelle fairing. As a result, the aerodynamic characteristics of the nacelle fairing are altered relative to a cruising flight situation or away from an obstacle. When the aircraft is in vertical, hovering, or low-speed flight over a sufficiently close surface, that surface affects the flow pattern around the aircraft, particularly around the nacelle fairing. This effect is referred to hereafter as "ground effect".

For optimum aerodynamic performance, it would therefore be advantageous to adapt the shape of the airfoils constituting the nacelle fairing to the flight conditions of the aircraft (especially when "ground effects" are important).

In current technology, there are solutions for adapting the shape of an airfoil to the flight conditions of an aircraft, but the vast majority of them concern aircraft wings, as these solutions are not transposable or adaptable to axisymmetric elements such as the nacelle fairings of the propulsion system (e.g. turbojet engines or an electric thruster).

Double-flow turbojet engines have been proposed, where it is possible to locally vary the geometry of a secondary airflow duct, or turbojet engines with a nacelle fairing where it is possible to vary the inlet cross section.

However, none of these proposed solutions proposes to adapt the outlet or inlet section of a nacelle fairing of the propulsion system, in particular in VTOL rotor mode, to the flight conditions of an aircraft.

There is therefore a need to provide a simple and effective solution to the above problems.

SUMMARY

One aim of the present disclosure is to propose a solution allowing the simple and rapid adaptation of aircraft propulsion systems in order to optimize their aerodynamic and acoustic performances, according to the aircraft flight phases, while ensuring the safety of the rotors.

For this purpose or others, the disclosure relates to a propulsion system for an aircraft, having at least one rotor and a nacelle fairing extending around the at least one rotor with respect to an axis of rotation of the rotor. In an embodiment, the nacelle fairing comprises:

an upstream section forming an inlet section of the nacelle fairing;

a downstream section, a downstream end of which forms an outlet section of the nacelle fairing; and an intermediate section connecting the upstream and downstream sections, wherein the downstream section comprises a radially inner wall and a radially outer wall made of a shape memory material, and wherein the downstream section comprises at least one actuator mechanism with a cylinder configured to cooperate with means embedded in an inner surface of the radially outer wall, so as to vary an outer diameter of the outlet section between a determined minimum diameter and a determined maximum diameter.

Embodiments of the propulsion system thus make it possible to benefit in a simple and rapid manner, according to the needs of the aircraft, from a form of nacelle fairing adapted to the aircraft's flight conditions so as to ensure optimal propulsion efficiency while minimizing the noise pollution induced by the rotor of the propulsion system and ensuring the safety of this rotor by the presence of the nacelle fairing. In other words, embodiments of the propulsion system benefit from the presence of a nacelle fairing while having the possibility of adapting it to the aircraft's flight conditions.

In some embodiments, the inlet section of the nacelle fairing of the propulsion system can correspond to a leading edge of the nacelle fairing. In these embodiments, the outlet section of the fairing may correspond to a trailing edge of the fairing. Thus, the outer diameter of the trailing edge may correspond to the outer diameter of the outlet section of the propulsion system.

According to example embodiment, the means embedded in the radially outer wall comprise a plurality of prisms distributed in at least one annular row, this plurality of prisms being actuated by the at least one cylinder via at least one annular element.

In some embodiments, the propulsion system further comprises stiffening bridges connecting the radially inner and radially outer walls of the downstream section and making it possible to ensure a substantially constant distance between the radially inner and radially outer walls of the downstream section, in particular when passing from a convergent position to a divergent position of the downstream section of the nacelle fairing of the propulsion system, and vice versa.

In some embodiments, the intermediate section is rigid and is connected by at least one arm to a motor of the propulsion system. This provides, for example, the nacelle fairing of the propulsion system with a rigid structure that can perform a shielding function.

In some embodiments, the upstream section is made of a deformable shape-memory material, this section comprising means for varying an outer diameter of the inlet section of the propulsion system. In this way, the nacelle fairing of the propulsion system can be easily adapted, for example, according to the phases of flight of an aircraft equipped with such a propulsion system.

According to an example embodiment, the outer diameter of the inlet section varies under the effect of a pneumatic or hydraulic expansion device. This solution has the interesting advantage of, for example, not requiring a lot of energy to be implemented.

In another example embodiment, the outer diameter of the inlet section varies under the effect of a heating annular coating, with the upstream section still having heat-shrinkable characteristics. This solution is, for example, simple to install, is compact and has low weight.

According to another example embodiment, the outer diameter of the inlet section varies under the effect of an actuator mechanism with a cylinder configured to cooperate with means integral with an inner surface of a radially outer wall of the upstream section.

According to another example embodiment, the outer diameter of the inlet section varies under the effect of a pneumatic or hydraulic annular actuator configured to deform radially under the effect of a predetermined control pressure.

In some embodiments, the upstream section comprises stiffeners connected by an anti-buckling device. This makes it possible, for example, to maintain a homogeneous aerodynamic profile of the inlet section of the nacelle fairing of the propulsion system according to the disclosure.

The present disclosure further relates to an aircraft comprising at least one propulsion system having at least one of the above-mentioned characteristics, the propulsion system being mounted so as to pivot on the aircraft by means of a pivot shaft which is offset or through with respect to the rotor.

As mentioned above, the nacelle fairing of the propulsion system according to the disclosure can be easily adapted according to the phases of flight of an aircraft equipped with such a propulsion system, as well as according to the translational or vertical flight mode of the aircraft.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In this statement, the terms "axial", "inner" and "outer" are used in reference to the axis of rotation of the propulsion system according to the disclosure.

Generally described, a propulsion system is generally composed of: a nacelle; an engine and its command and control system; and, in the case of a propeller or rotor propulsion, its propeller or rotor(s).

The nacelle is the element that allows the engine to be integrated into the aircraft, and can be made up of, for example: nacelle fairings (enabling the engine to be cowled, the rotors to be faired, the air in flow during operation of the aircraft to be captured, a thrust effect to be created, reverse thrust on the propulsion systems, . . . ); equipment to be mounted on the engine (such as the engine cowling, which includes the electrical, hydraulic and pneumatic systems known as the Engine Build-Up Unit (EBU)); and systems for attachment to the aircraft.

Figure 1A:
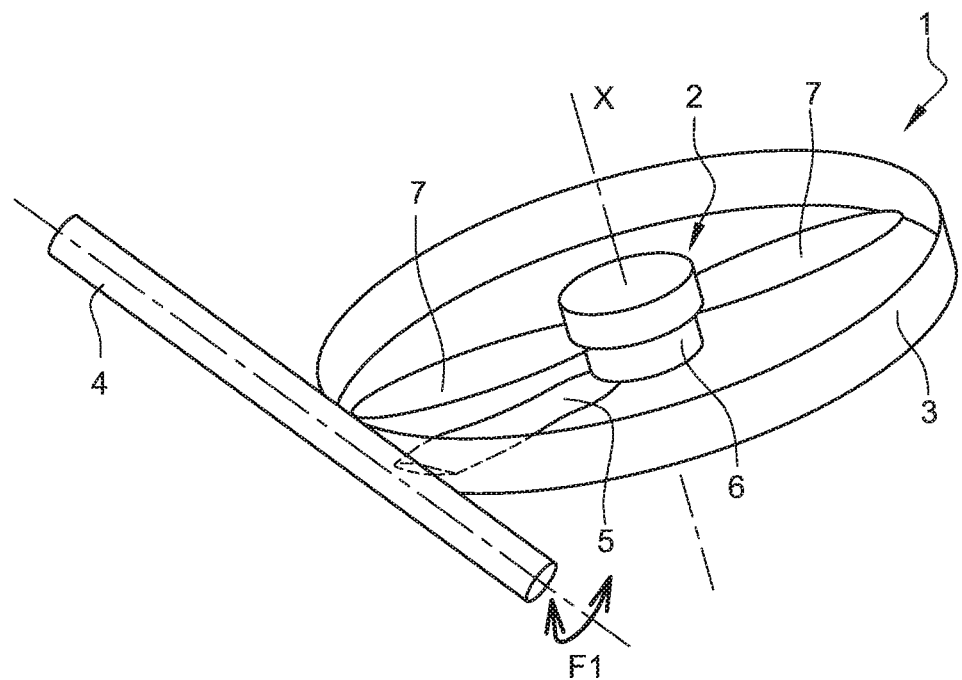
FIG. 1A is a schematic perspective view of a first embodiment of a propulsion system shown with a nacelle mounted on an offset pivot axis, the propulsion system being in a horizontal position.
Figure 1B:
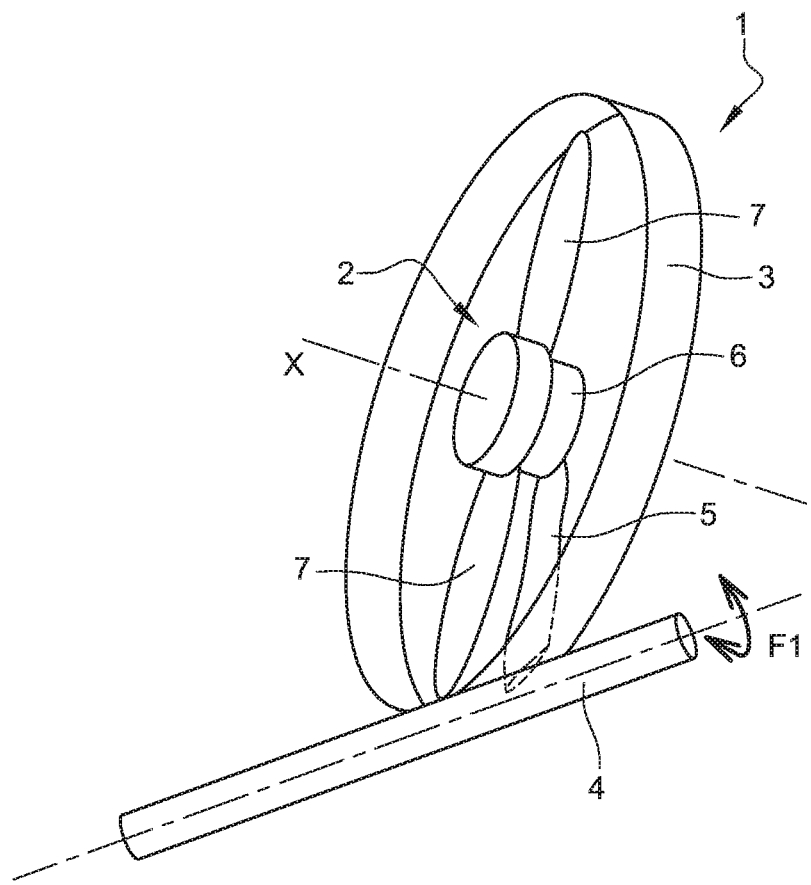
FIG. 1B is a view analogous to FIG. 1A, showing the propulsion system in a vertical position.

FIGS. 1A and 1B illustrate, in a simplified manner, a first embodiment of a propulsion system 1 for aircraft according to the disclosure. As shown in FIGS. 1A and 1B, the propulsion system 1 comprises at least one rotor 2 and a nacelle fairing 3 extending around the at least one rotor 2 with respect to an axis of rotation X of the rotor 2. The propulsion system 1 can be mounted fixedly on the aircraft. The propulsion system 1 may also be mounted on a pivot shaft 4, offset from the axis of rotation X of the rotor 2. The pivot shaft 4 shall be attached by any technique or methodology to the propulsion system 1 on the one hand and to the aircraft on the other hand, and shall permit the orientation of the propulsion system 1 on the aircraft, allowing the propulsion system 1 to be tilted about the pivot shaft 4, according to the arrow F1, by actuators between a horizontal position as shown in FIG. 1A and a vertical position as shown in FIG. 1B. This tilt allows the aircraft to be switched from a conventional mode such as for an airplane, to a VTOL or helicopter mode.

The rotor 2 of the propulsion system 1 is connected to the aircraft by a mast 5 supporting a motor 6, e.g. an electric motor, which drives the rotor 2 in rotation via a power shaft. According to the example shown, each rotor 2 has two blades 7.

Figure 1C:
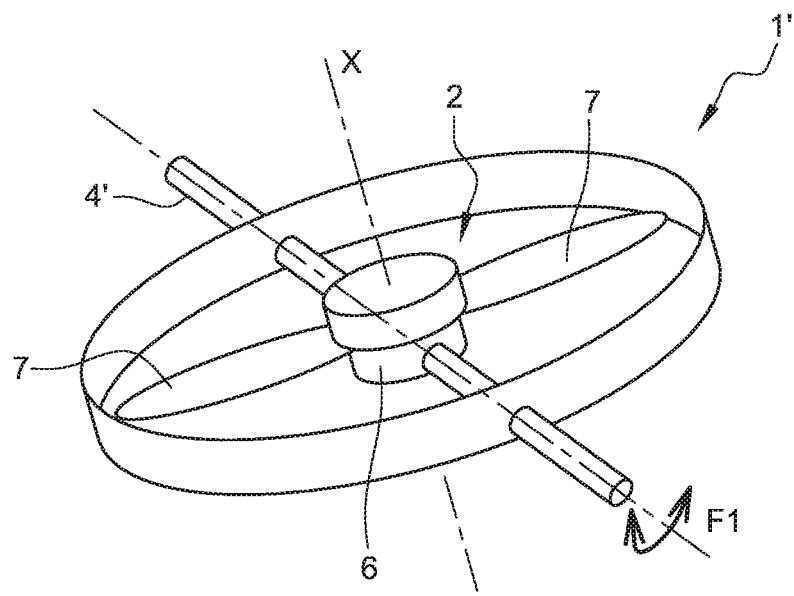
FIG. 1C is a schematic perspective view of a second embodiment of a propulsion system shown with a nacelle mounted on a through pivot axis, with the propulsion system in a horizontal position.

FIG. 1C illustrates a second embodiment of a propulsion system 1' for aircraft according to the disclosure in which the propulsion system 1' can be mounted on a pivot shaft 4', passing through the rotor 2 perpendicularly to the axis of rotation X of the rotor 2. The rotor 2 of the propulsion system 1' is connected to the aircraft by a mast 5 supporting a motor 6, e.g. electric motor, which drives the rotor 2 in rotation via a power shaft. According to the example embodiment shown, the mast 5 of the rotor 2 is the same as the pivot shaft 4'.

With reference to FIGS. 2 to 6C, the nacelle fairing 3 of the propulsion system 1, 1' comprises, for example: an upstream section 10; a downstream section 20; and an intermediate section 30 connecting the upstream section 10 and downstream section 20.

The upstream section 10 forms a leading edge or air inlet section BA of the nacelle fairing 3. In some embodiments, the upstream section 10 is made of a deformable shape memory material and it comprises means for varying an outer diameter $D_{BA}$ of the inlet section BA.

The material constituting the upstream section 10 is both rigid to give the upstream section 10 a structuring shape and flexible to give the upstream section 10 a possibility of deformation, it is thus called "semi-rigid". Thus, the upstream section 10 is made of a material capable of reacting under the effect of an actuator as described below. When the upstream section 10 is excited by the actuator, the upstream section 10 assumes a convergent structuring shape, and when the excitation stress of the actuator stops, the upstream section 10 returns to its initial shape. The material composing the upstream section 10 can thus be an alloy, a composite or an organic material allowing the upstream section 10 to work in an elastic range. For example, the upstream section 10 is made of a nickel-titanium alloy (also known as "Kiokalloy") such as NiTiNol or NiTiCu.

More specifically, with reference to FIGS. 6A to 7C, the upstream section 10 comprises an upstream annular lip 11 and a downstream annular portion 12. The downstream annular portion 12 comprises a radially inner wall 12a and a radially outer wall 12b. These radially inner wall 12a and radially outer wall 12b are connected, on the one hand, upstream, to the lip 11 and, on the other hand, downstream, to the intermediate section 30.

A purpose of the present disclosure is to be able to benefit from a nacelle fairing 3 of the propulsion system 1, 1' whose air inlet cross-section and in particular the shape of the aerodynamic profiles constituting the nacelle fairing can be varied. In other words, it is possible to vary the outer diameter $D_{BA}$ of the inlet section BA and the aerodynamic shape of the upstream section 10 between a so-called convergent configuration in which an air flow tube at the inlet of the nacelle fairing 3 has a convergent shape, and a so-called neutral configuration in which an air flow tube at the inlet of the nacelle fairing 3 has a substantially cylindrical neutral shape.

Figure 6A:
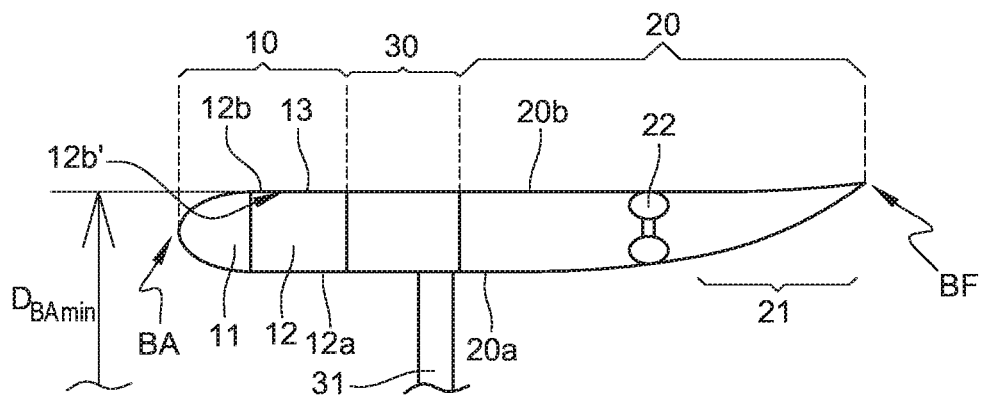
FIG. 6A is a partial cross-sectional and schematic view of the nacelle fairing of the propulsion system according to an embodiment of the disclosure showing the entry of the nacelle fairing in the neutral position.
Figure 6B:
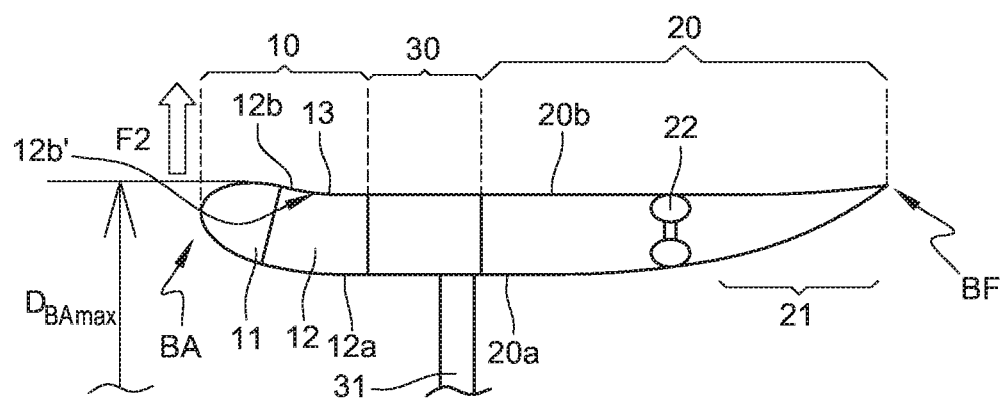
FIG. 6B is a view similar to FIG. 6A showing the inlet of the nacelle fairing in the convergent position.

FIGS. 6A and 6B schematically show the variation of the outer diameter $D_{BA}$ of the inlet section BA between a so-called neutral position (FIG. 6A) in which the outer diameter is minimum $D_{BAmin}$ and a so-called convergent position (FIG. 6B) in which the outer diameter is maximum $D_{BAmax}$, the outer diameter in the convergent position $D_{BAmax}$ being therefore greater than the outer diameter in the neutral position $D_{BAmin}$ and the inlet (i.e. the upstream section 10) of the nacelle fairing 3 is so-called convergent. In other words, there is an evolution of the air flow duct such that the radial dimension of the air inlet section is greater than the radial dimension of the air outlet section. This is therefore not a geometrical definition of convergence but a fluidic definition.

According to an embodiment, in order to vary the outer diameter $D_{BA}$ of the inlet section BA between the neutral position and the convergent position, and vice versa, the upstream section 10, and more precisely the radially inner wall 12a and the radially outer wall 12b of the downstream annular portion 12 of the upstream section 10 are made of a material with heat-shrinkable characteristics which can deform, i.e. shrink, under the effect of heat. For this purpose, the radially outer wall 12b of the downstream annular portion 12 further comprises a heating annular coating 13 configured to supply heat in order to deform, more precisely to shrink, the radially outer wall 12b of the upstream section. Thus, in the neutral position, as shown in FIG. 6A, the radially inner wall 12a and the radially outer wall 12b have substantially equal axial dimensions.

On the other hand, under the effect of the heat generated by the heating coating 13, the radially outer wall 12b shrinks, i.e. its axial dimension decreases with respect to its neutral axial dimension, causing the radially inner wall 12a to stretch, i.e. its axial dimension increases with respect to its neutral axial dimension. As will be detailed below, the intermediate section 30 is rigid so that the upstream section 10 is fixed by means of its radially inner wall 12a and outer wall 12b integral with the intermediate section 30, the inlet section BA being free, so that the retraction of the radially outer wall 12b and the stretching of the radially inner wall 12a cause the lip 11 (or the inlet section BA) to move in a radially outer direction represented by the arrow F2 in FIG. 6b, thereby causing an increase in the outer diameter $D_{BA}$.

The heating annular coating 13 can be heated by any technique or methodology, such as for example by a resistive electrical circuit circulating in the coating 13. In some embodiments, the radially inner wall 12a and the radially outer wall 12b of the downstream annular portion 12 of the upstream section 10 are made of a material also having shape memory characteristics so as to enable them to regain their shape and neutral axial dimension, and, consequently, so that the inlet section BA also regains its neutral diameter $D_{BAmin}$ when the heating coating 13 is no longer heated.

Figure 6C:
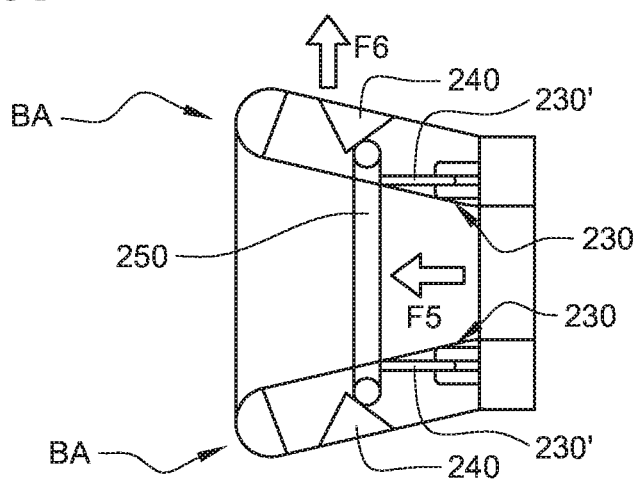
FIG. 6C is a schematic longitudinal section view of the upstream section of the nacelle fairing shown in the converging position.

According to another embodiment illustrated in FIG. 6C, in order to vary the outer diameter $D_{BA}$ of the inlet section BA between the neutral position and the convergent position, and vice versa, the upstream section 10 comprises at least two actuator mechanisms 230 with a cylinder that are diametrically equally distributed and configured to cooperate with structure, projection or component 240 integral with the inner surface 12b' of the radially outer wall 12b, so as to vary an outer diameter $D_{BA}$ of the inlet section BA between a minimum diameter and a maximum diameter.

In some embodiments, a cylinder arm 230' of the actuator mechanism 230 with cylinder is configured to extend or retract under the effect of a predetermined command so as to act on the component 240 and move the latter radially, causing a thrust on the radially inner surface 12b' of the radially outer wall 12b and thus vary an outer diameter $D_{BA}$ of the inlet section BA. The actuator mechanism 230 with cylinder can be electric, hydraulic, pneumatic or a screw-nut system.

For example, the component 240 are embedded (e.g. by vulcanization) in the radially inner surface 12b' of the radially outer wall 12b and move radially under the action of the actuator mechanisms 230 with cylinder.

According to an example embodiment, the component or means 240 comprise a plurality of prisms, for example of triangular cross-section, distributed in at least one annular row, this plurality of prisms being actuated by the at least one cylinder via at least one annular element 250. The prisms 240 and the annular element 250 are made of a rigid material, for example metal.

In FIG. 6C, the upstream section 10 of the nacelle fairing 3 is in a convergent position, the cylinder arm 230' of the actuator mechanism 230 with cylinder is fully extended.

Actuation of the actuator mechanism 230 with cylinder causes the cylinder arm 230' to be extended, which causes axial movement of the annular element 250 (in the direction of arrow F5 in FIG. 6C), which in turn causes radially outward movement of the prism row 240 (in the direction of arrow F6). The annular element 250 moves on the faces of the prisms 240 so as to be, in the neutral position of the upstream section of the nacelle fairing 3, in a position flush with the inner surface 12b' of the inner wall 12b and, in the convergent position of the upstream section 10 of the nacelle fairing 3, in a position close to the tops of the prisms 240. The prisms 240 being embedded in the radially inner surface 12b' of the radially outer wall 12b and the annular element 250 being rigid, the diameter of the radially outer wall 12b and of the radially inner wall 12a increases under the effect of the radial thrust of the prisms 240, causing the diameter of the inlet section BA to increase, thereby causing the upstream section 10 of the nacelle fairing 3 to change to a convergent configuration as shown in FIG. 6C. Advantageously, the faces of the prisms 240 and the annular element 250 are covered with an anti-friction coating.

When the actuator mechanism 230 with cylinder is actuated to retract the cylinder arm 230', the elements described above move in an opposite direction tending to decrease the diameter of the inlet section BA. Since the radially inner wall 12a and radially outer wall 12b of the upstream section 10 are made of shape memory material, this has the effect of returning the upstream section 10 of the nacelle fairing 3 to the neutral configuration as shown in FIG. 6A.

In some embodiments, each annular row comprises at least four prisms 240 distributed azimuthally equidistantly along the radially inner surface 12b' of the radially outer wall 12b of the upstream section 10. It is easy to understand that a high number of prisms will make it possible to better distribute the radial thrusts and thus to keep a more axisymmetrical shape of the upstream section 10 of the nacelle fairing 3 in a convergent position.

It could still be envisaged that the propulsion system 1, 1' comprises several rows of prisms 240 and as many cylinders actuator mechanisms 230 specific to each annular row of prisms 240, independent of each other.

In another example embodiment, annular rings are directly connected to the cylinder arm 230' of each actuator mechanism 230. Each annular ring then slides directly on the inner surface 12b' of the outer wall 12b (convergent at rest). In some embodiments the inner surface 12b' of the outer wall 12b' is then provided with an anti-friction coating.

The transition from the convergent configuration to the neutral configuration of the upstream section 10 of the nacelle fairing 3, and vice versa, is made continuously depending on the extension or retraction of the cylinder arm 230' of the actuator mechanism 230'.

According to another embodiment, in order to vary the outer diameter $D_{BA}$ of the inlet section BA between the neutral position and the convergent position, and vice versa, the inlet section BA of the nacelle fairing 3 has a pneumatic or hydraulic annular actuator 40 extending around the axis of rotation X of the rotor 2. This annular actuator 40 is configured to deform radially under the effect of a predetermined control pressure so as to vary an outer diameter $D_{BA}$ of the inlet section BA between a minimum and a maximum diameter.

Specifically, the annular actuator 40 is configured to radially deform under a predetermined control pressure so as to vary an outer diameter $D_{BA}$ of the inlet section BA between a neutral position and a convergent position of the upstream section 10 of the nacelle fairing 3. For this purpose, the annular actuator is connected to an automatic pneumatic or hydraulic device and allowing to introduce or extract a fluid into or from this annular actuator 40 by applying a control pressure adapted according to the desired convergent or neutral configuration for the downstream section 10 of the nacelle fairing 3.

In some embodiments, the annular actuator 40 is made of a radially stiffened elastic material, e.g. including fibers. For example, it is made of polymer material incorporating an external device or inclusions stiffening it in the radial direction.

Figure 8A:
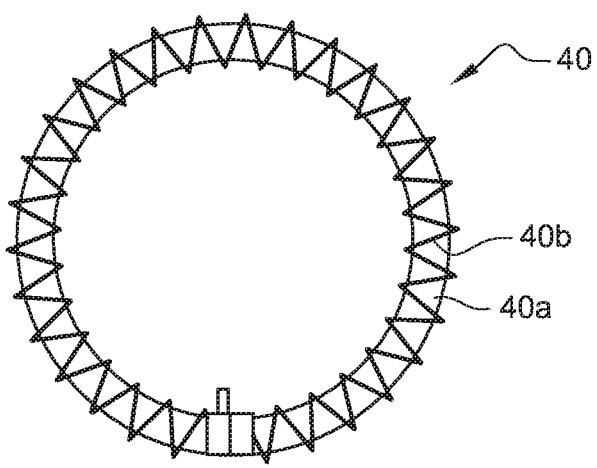
FIG. 8A is a schematic front view of an example embodiment of the annular actuator according to the disclosure.
Figure 8B:
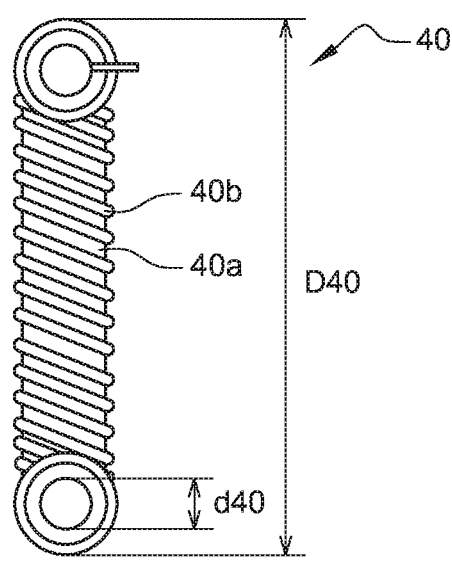
FIG. 8B is a schematic sectional view of an example embodiment of the annular actuator, shown in a rest position.
Figure 8C:
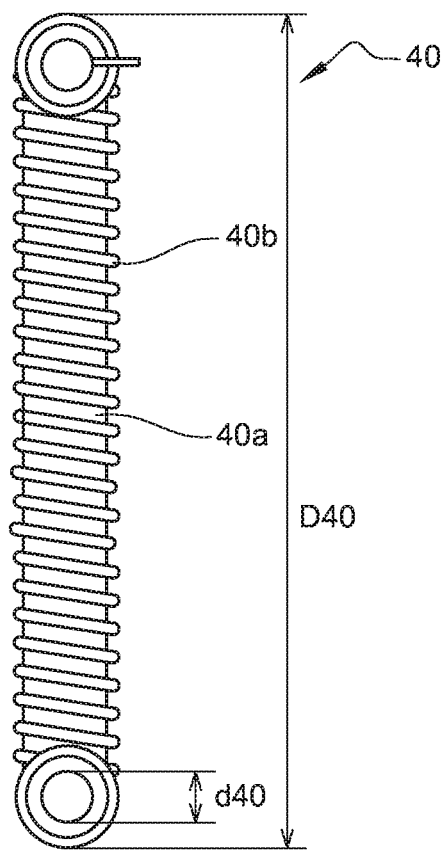
FIG. 8C is a schematic sectional view of an example embodiment of the annular actuator, shown in a convergent position.

According to another example of embodiment illustrated in FIGS. 8A to 8C, the annular actuator 40 comprises an annular bladder 40a of flexible material enshrined in a spiral spring 40b having the function of limiting the diametrical expansion of the section of flexible bladder 40a. An alternative embodiment could be the use of an orthotropic material having a higher elastic modulus in a radial direction than in an azimuthal direction.

The annular actuator 40 is configured such that, when subjected to an increase in pressure, an expansion of an inner section diameter $d_{40}$ of the annular actuator is much smaller than an expansion of an outer diameter $D_{40}$ of the annular actuator 40. In other words, an increase in pressure inside the annular actuator 40 (or the flexible bladder 40a) results in an azimuthal expansion increasing the outer diameter $D_{40}$ of the annular actuator 40.

In some embodiments, the progressive increase in the control pressure induced by the pneumatic or hydraulic automatic device progressively varies the outer diameter $D_{40}$ of the annular actuator 40 which deforms the radially inner wall 12a and radially outer wall 12b of deformable material with shape memory of the upstream section 10 and, therefore, varies the outer diameter $D_{BA}$ of the inlet section BA from a minimum diameter $D_{BAmin}$ in the neutral configuration as shown in FIG. 6A to a maximum diameter $D_{BAmax}$ in the converging configuration of the upstream section 10 of the nacelle fairing 3 as shown in FIG. 6B.

Similarly, the progressive reduction of the control pressure induced by the pneumatic or hydraulic automatic device progressively changes the upstream section 10 of the nacelle fairing 3 from a convergent configuration as shown in FIG. 6B to a neutral configuration as shown in FIG. 6A.

The transition from the neutral to the convergent configuration of the upstream section 10 of nacelle fairing 3, and vice versa, is made continuously as a function of the control pressure induced by the pneumatic or hydraulic automatic device.

According to another example embodiment, the means for varying the outer diameter $D_{BA}$ of the inlet section BA between the neutral position and the convergent position, and vice versa, comprise a pneumatic expansion device. For example, pressurized air is injected into the interior of the upstream annular lip 11 so that this lip moves in a radially outward direction, causing the radially outer wall 12b to retract and the radially inner wall 12a of the downstream annular portion of the upstream section 10 to stretch, and consequently causing the outer diameter $D_{BA}$ of the inlet section BA to increase. The walls 12a, 12b are made of a deformable shape memory material so that they regain their shape and neutral axial dimension and, consequently, so that the inlet section BA also regains its neutral diameter $D_{BAmin}$ when air is removed from the upstream annular lip 11 by the pneumatic expansion device.

This possibility of easily modifying the outer diameter $D_{BA}$ of the inlet section BA of the nacelle fairing 3 allows the inlet profile of the nacelle fairing 3 to be easily adapted to the flight phases of an aircraft equipped with a propulsion system 1, 1', i.e. according to the aerodynamic and mechanical constraints sought in operation of the propulsion system 1, 1'. Thus, in the near-ground hovering flight phase, for example, the lift created by the nacelle fairing 3 will be increased by using an air inlet of the convergent nacelle fairing and consequently having the largest possible outer diameter $D_{BA}$ of the inlet section BA, whereas in the flight phase in aircraft mode or away from the ground, the aim will be to benefit from the best propulsion performance and consequently to have the smallest possible outer diameter $D_{BA}$ of the inlet section BA.

As the upstream section 10 is made of a deformable material, it is advisable to guarantee it a rigid structure so as to avoid its collapse both at rest and under the action of an air flow during operation of the propulsion system 1, 1' and thus allowing the nacelle fairing 3 to maintain a homogeneous aerodynamic profile of its inlet section BA. In this way, the upstream section 10 advantageously comprises stiffeners 14 connected by an anti-buckling device 15.

Figure 7A:
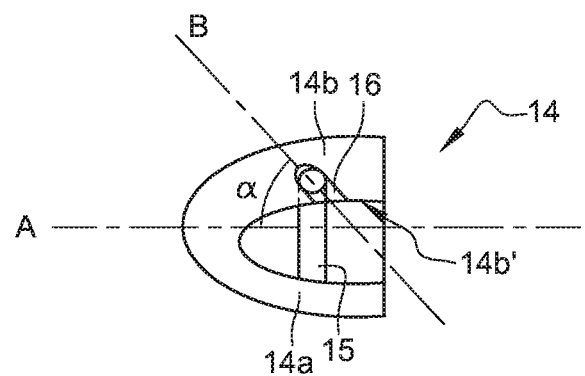
FIG. 7A is a detailed cross-sectional view of the inlet of the nacelle fairing of the propulsion system in the neutral position.
Figure 7B:
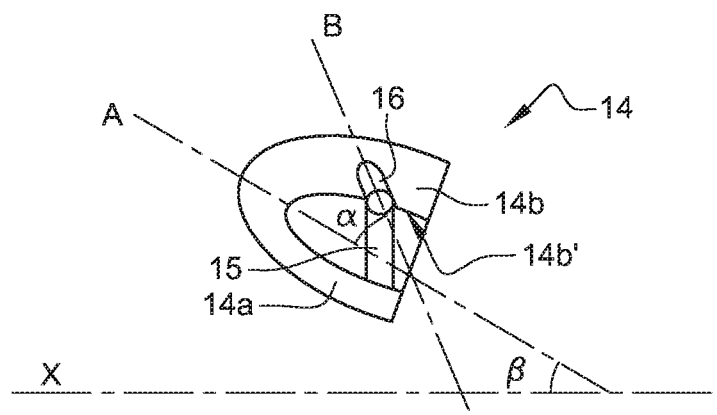
FIG. 7B is a view similar to FIG. 7a showing the inlet of the nacelle fairing of the propulsion system in the converging position.
Figure 7C:
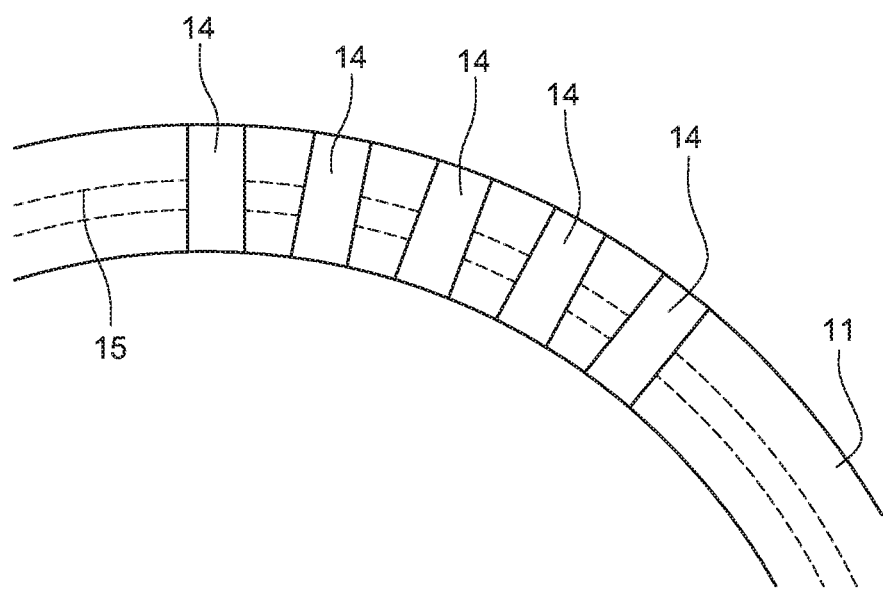
FIG. 7C is a partial front view of the inlet of the nacelle fairing of the propulsion system.

With reference to FIGS. 7A to 7C, a plurality of stiffeners 14 are provided in the annular upstream lip 11 of the upstream section 10 and are angularly distributed as can be seen in FIG. 7C. These stiffeners, e.g. made of metal, have an aerodynamic profile with a C-shaped cross-section so as to correspond to the aerodynamic shape of the inlet section BA of the nacelle fairing 3. A radially outer arm 14b of the stiffeners 14, opposite a radially inner arm 14a, has a notch 16 for receiving the anti-buckling device 15, formed in the arm 14b and extending along an axis B from a radially inner surface 14b'.

According to the example shown, the anti-buckling device 15 consists of a rigid ring, e.g. made of metal. The anti-buckling device 15 thus inserted into the notches 16 of each stiffener 14 serves as a reinforcement connecting the stiffeners 14 to the inside of the upstream annular lip 11. The notches 16 have a semi-oblong shape inclined at an angle α to a longitudinal axis A of the stiffeners 14.

With reference to FIG. 7A, when the upstream section 10 is in a neutral position so that the outer diameter $D_{BA}$ of the inlet section BA is minimal $D_{BAmin}$, the stiffeners 14 are in a rest position in which the longitudinal axis A of the stiffeners 14 is substantially parallel to the axis of rotation X of the rotor 2 of the propulsion system 1, 1' and the anti-buckling ring 15 is positioned in abutment in the bottom of notch 16 of the stiffeners 14.

With reference to FIG. 7B, when the upstream section 10 is convergent so as to increase the outer diameter $D_{BA}$ of the inlet section BA to a maximum value $D_{BAmax}$, the stiffeners 14 are in an inclined position in which the longitudinal axis A of the stiffeners 14 is inclined at an angle β with respect to the axis of rotation X of the rotor 2 of the propulsion system 1, 1' and the anti-buckling ring 15 is still engaged in the notch 16 but in a position such that it does not come out of the radially inner surface 14b' of the radially outer arms 14b of the stiffeners 14.

However, such anti-buckling 15 is not necessary for the embodiment using the prisms 240, the actuator mechanism 230 with cylinder and the annular element 250 to vary the outer diameter $D_{BA}$ of the inlet section BA, as these elements (230, 240, 250) already provide the anti-buckling function.

The upstream section 10, and in particular the upstream annular lip 11, is still configured to provide an anti-icing function for the inlet of the nacelle fairing 3. The upstream section 10 is in fact made of a material that makes it capable of withstanding significant temperature variations, making it suitable for providing an anti-icing function when supplied with hot air.

The intermediate section 30 is rigid. For example, it is made of aluminum alloy, Ta6V or organic matrix carbon fiber composite.

The intermediate section 30 is advantageously connected to the motor 6 of the propulsion system 1, 1' by at least one arm 31, and preferably by two arms 31 so as to mechanically secure the nacelle fairing 3 to the motor 6 of the propulsion system 1, 1'. The intermediate section 30 thus confers, by its material and configuration, a shielding function to the propulsion system 1, 1'.

A downstream end of the downstream section 20 forms an outlet section (or otherwise known as a trailing edge BF) of the nacelle fairing 3. In some embodiments, the downstream section 20 comprises a radially inner wall 20a and a radially outer wall 20b. The radially inner wall 20a and the radially outer wall 20b of the downstream section 20 not only perform a structural function of the downstream section 20 but also an aerodynamic function.

The radially inner wall 20a and the radially outer wall 20b of the downstream section 20 are made of a deformable semi-rigid shape-memory material. In other words, the material constituting the radially inner wall 20a and the radially outer wall 20b of the downstream section 20 is both rigid to give the downstream section 20 a structuring shape and flexible to give the downstream section 20 a possibility of deformation. Thus, the radially inner wall 20a and the radially outer wall 20b of the downstream section 20 are made of a material capable of reacting under the effect of an actuator as described below. When the radially inner wall 20a and the radially outer wall 20b of the downstream section 20 are excited by the actuator, the walls deform and assume a structuring shape (i.e. a divergent neutral shape without convergent excitation), and when the excitation stress of the actuator stops, the walls return to their original shape. The material making up walls 20a and 20b can thus be an alloy, a composite or an organic material allowing walls 20a and 20b to work in an elastic range. For example, the radially inner wall 20a and outer wall 20b are made of a nickel-titanium alloy (also known as "Kiokalloy") such as NiTiNol or NiTiCu.

The shape memory material constituting the radially inner wall 20a and outer wall 20b is fail-safe, i.e. it is in its rest position, i.e. when the actuator does not act on the shape memory material for deformation, corresponds to a natural storage geometry of the material or of longer duration of use, i.e. in the case of use for a downstream section 20 of the nacelle fairing 3 of an aircraft propulsion system 1, 1', it corresponds to a convergent shape of the downstream section 20. Thus, in the event of actuator failure, the shape memory material will return to its natural shape at rest and the nacelle fairing 3 will return to a safe geometry to ensure the proper functioning of the aircraft propulsion system 1, 1'.

The radially inner wall 20a and outer wall 20b may also have a variable thickness axially and also azimuthally in the vicinity of the stiffening bridges 22 so as to locally modify the elasticity of the shape memory material constituting them. It is furthermore possible to locally optimize the mechanical characteristics of the shape memory material constituting the radially inner wall 20a and outer wall 20b according to the desired local properties along the downstream section 20. Thus, it can be envisaged that the downstream section 20 is made up of a plurality of sections of different materials.

The downstream section 20 being made of a semi-rigid material guaranteeing it a rigid structural shape so as to avoid its collapse both at rest and under the action of an air flow during operation of the propulsion system 1, 1' and thus allowing the nacelle fairing 3 to maintain a homogeneous aerodynamic profile of its outlet section BF. In some embodiments, the downstream end 21 of the downstream section 20 can be made of an orthotropic material with adequate elastic modules.

Furthermore, in order to ensure a substantially constant distance between the radially inner wall 20a and the radially outer wall 20b of the downstream section 20, stiffening bridges 22 are angularly arranged at regular intervals between these walls 20a, 20b.

The downstream section 20 further comprises one or more components or means for varying an outer diameter $D_{BF}$ of the outlet section BF between a minimum outer diameter $D_{BFc}$ corresponding to a convergent position of the downstream section 20 of the nacelle fairing 3 and a maximum outer diameter $D_{BFd}$ corresponding to a divergent position of the downstream section 20 of the nacelle fairing 3. Again, the terms "convergent" and "divergent" used in reference to the downstream section 20 are fluidic and not geometric considerations.

Indeed, another purpose of the present disclosure is to be able to benefit from a nacelle fairing 3 of propulsion system 1, 1' whose air outlet section and in particular the shape of the aerodynamic profiles constituting the nacelle fairing can be varied. In other words, it is possible to vary the outer diameter $D_{BF}$ of the outlet section BF and the aerodynamic shape of the downstream section 20 between a so-called convergent configuration in which an air flow tube at the outlet of the nacelle fairing 3 has a convergent shape, and a so-called divergent configuration in which an air flow tube at the outlet of the nacelle fairing 3 has a divergent shape.

In other words, for a faired rotor, during the phases of flight of the aircraft where ground effects are negligible, the thrust created by the nacelle fairing 3, and therefore the efficiency of the propulsion assembly, will be maximized with an air outlet profile of the nacelle fairing 3 of convergent shape, while for other phases of flight such as hovering of the aircraft in the presence of ground effects, a diverging air exit profile of the nacelle fairing 3 is preferred, as it maximizes the thrust created by the nacelle fairing 3 under these conditions.

For the purpose of varying the profile of the outlet section, the downstream section 20 comprises at least two actuator mechanisms with cylinder 23 that are diametrically equally distributed and configured to cooperate with means 24, 24' integral with the inner surface 20b' of the radially outer wall 20b, so as to vary an outer diameter DBF of the outlet section BF between a minimum and a maximum diameter.

More precisely, a cylinder arm 23' of the actuator mechanism 23 with cylinder is configured to extend or retract under a predetermined command so as to act on the means 24, 24' and move the latter radially, causing a thrust on the radially inner surface 20b' of the radially outer wall 20b and thus causing an outer diameter $D_{BF}$ of the outlet section BF to vary between a so-called convergence diameter $D_{BFc}$ corresponding to a so-called convergent configuration of the downstream section 20 of the nacelle fairing 3, the cylinder 23 then being retracted, and a divergence diameter $D_{BFd}$ corresponding to a so-called divergent configuration of the downstream section 20 of the nacelle fairing 3, the cylinder 23 then being in full extension. The actuator mechanism 23 with cylinder can be electric, hydraulic, pneumatic or a screw-nut system.

In some embodiments, the downstream section 20 comprises at least two equidistantly distributed means 24, 24' (e.g. angularly positioned at 6 o'clock and 12 o'clock) to push in particular annular elements 25, 26 and connecting rods 27. The means 24, 24' are for example embedded (e.g. by vulcanization) in the radially inner surface 20b' of the radially outer wall 20b and move radially under the action of the actuating mechanisms 23 with cylinder. According to an example embodiment, the means 24, 24' comprise a plurality of prisms distributed in at least one annular row, this plurality of prisms being actuated by the at least one cylinder via at least one annular element 25.

Figure 5A:
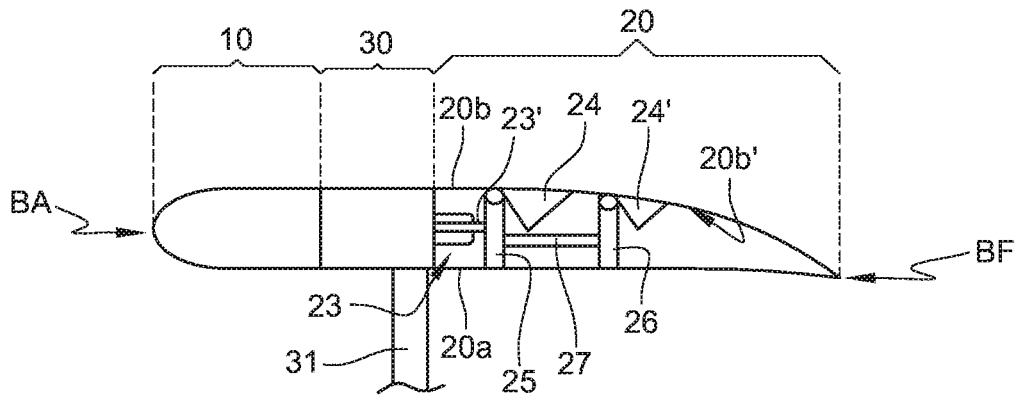
FIG. 5A is a partial schematic cross-sectional view of the nacelle fairing with its downstream section in a convergent position.
Figure 5B:
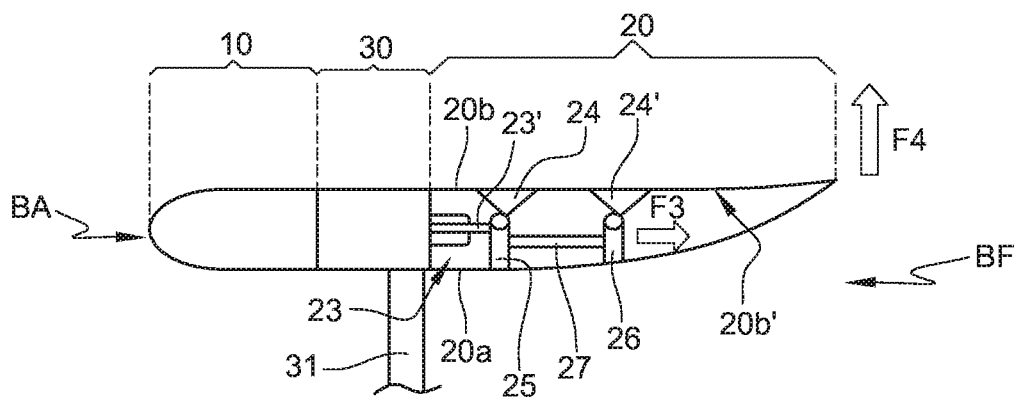
FIG. 5B is a view similar to FIG. 5A with the downstream section in a diverging position.

With reference to FIGS. 5A and 5B, the means 24 comprise a plurality of prisms (for example of triangular section) distributed in two annular rows. A first annular row of prisms 24 is connected to the or each cylinder arm 23' of the actuator mechanism(s) 23 with cylinder via a first annular element 25. A second annular row of prisms 24' is connected to the first annular row of prisms 24, more precisely to the first annular element 25 via a second annular element 26 and at least two rods 27 (arranged at 12 o'clock and 6 o'clock) and preferably a plurality of connecting rods 27, wherein the prisms 24, 24', the annular elements 25, 26 and the connecting rods 27 are made of a rigid material, e.g. metal.

In FIG. 5A, the downstream section 20 of the nacelle fairing 3 is in the convergent position, the cylinder arm 23' of the actuator mechanism 23 with cylinder is fully retracted. The radially inner wall 20a and the radially outer wall 20b are in a state of zero extension (i.e., walls 20a and 20b are at rest). The converging configuration of the downstream section 20 of the nacelle fairing 3 gives the radially inner wall 20a a decreasing diameter towards the outlet section BF.

The actuation of the actuator mechanism with cylinder 23 causes the cylinder arm 23' to be extended, which causes the axial displacement of the first annular element 25 (in the direction of arrow F3 of FIG. 5B), which in turn causes the radially outer displacement of the first row of prisms 24 (in the direction of arrow F4) and the axial displacement of the rods 27 and of the second annular element 26 (in the direction of arrow F3), which in turn causes the radially outer displacement of the second row of prisms 24' (in the direction of arrow F4). Since the prisms 24, 24' are embedded in the radially inner surface 20b' of the radially outer wall 20b and the annular elements 25, 26 are rigid, the diameter of the radially inner wall 20a increases as a result of the radial thrust of the prisms 24, 24'. This increase in diameter of the radially inner wall 20a induces the increase in diameter of the outlet section BF, the radially inner wall 20a and the radially outer wall 20b of the downstream section 20 being made of a deformable material, the modification of the geometry of the radially outer wall 20b leads to the modification of the geometry of the radially inner wall 20a due in particular to the bridges 22 in the direction of the arrow F4, having the effect of changing the downstream section of the nacelle fairing 3 to a divergent configuration as shown in FIG. 5b.

Thus, as can be seen in FIGS. 5C to 5F, the annular elements 25, 26 move on the faces of the prisms 24, 24' so as to be, in the convergent position of the downstream section 20 of the nacelle fairing 3, in a position flush with the inner surface 20b' of the inner wall 20b and, in the divergent position of the downstream section 20 of the nacelle fairing 3, in a position close to the tops of the prisms 24, 24'. Advantageously, the faces of the prisms 24, 24' and the annular elements 25, 26 are covered with an anti-friction coating.

Figure 5C:
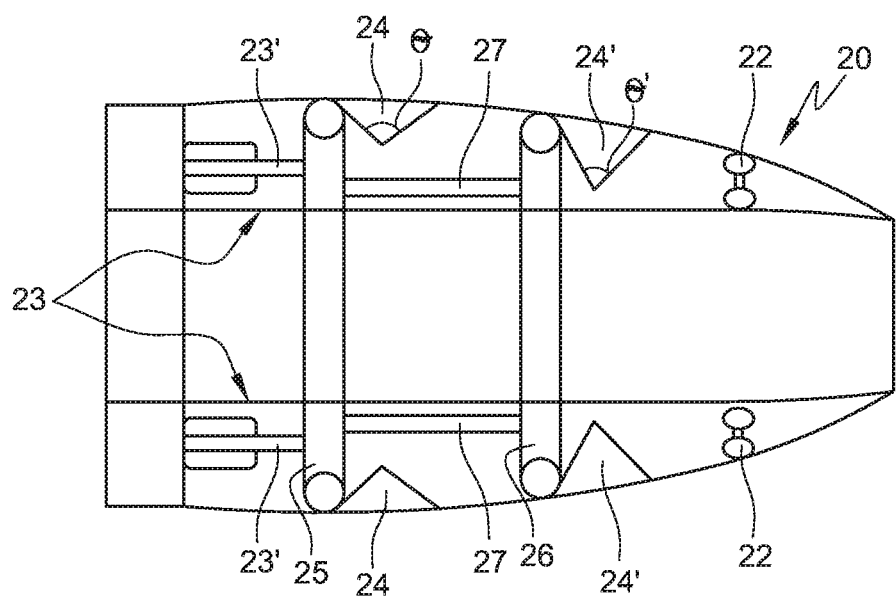
FIG. 5C is a schematic longitudinal section view of the downstream section of the nacelle fairing shown in converging position.
Figure 5D:
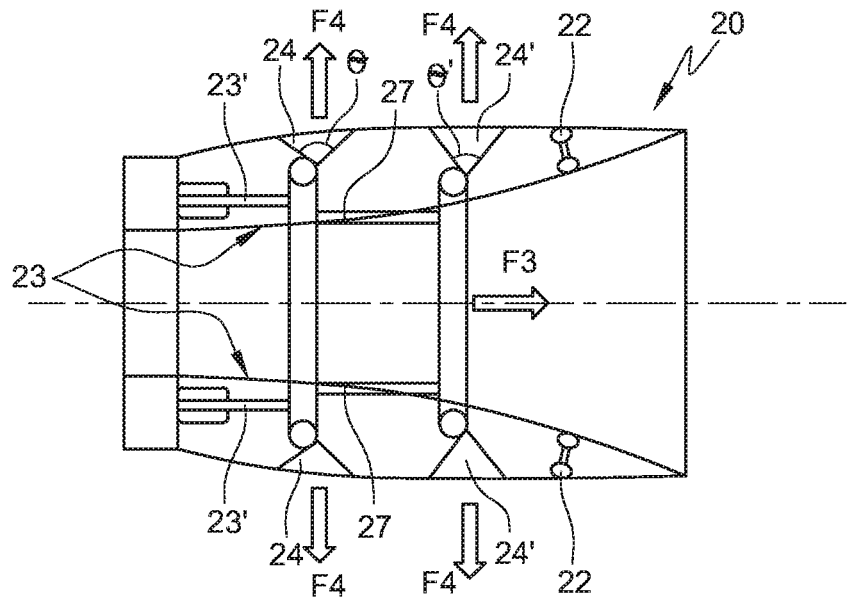
FIG. 5D is a schematic longitudinal section view of the downstream section of the nacelle fairing shown in a diverging position.

As can be seen in FIGS. 5C and 5D, the prisms 24 of the first annular row (which is closer to the intermediate section 30) and the prisms 24' of the second annular row (which is closer to the BF outlet section) have different dimensions. In particular, the prisms 24' have a smaller apex angle θ' than the apex angle θ of the prisms 24'. In fact, we understand that in order to make the downstream section 20 of the nacelle fairing 3 pass from a convergent position to a divergent position, the inner wall 20a and outer wall 20b undergo displacements of variable amplitude increasing as they approach the outlet section, the prisms 24, 24' being thus configured to allow this variable amplitude of radial displacement of the inner wall 20a and outer wall 20b for the same axial displacement of the annular elements 25, 26.

Figure 5E:
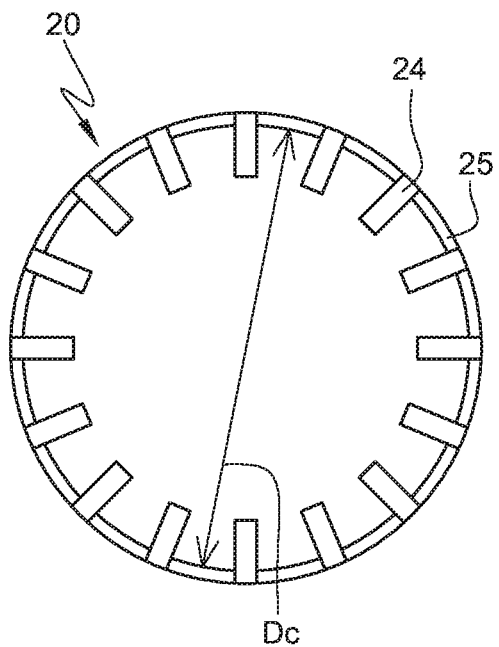
FIG. 5E is a schematic cross-sectional view of the downstream section of the nacelle fairing shown in the converging position.
Figure 5F:
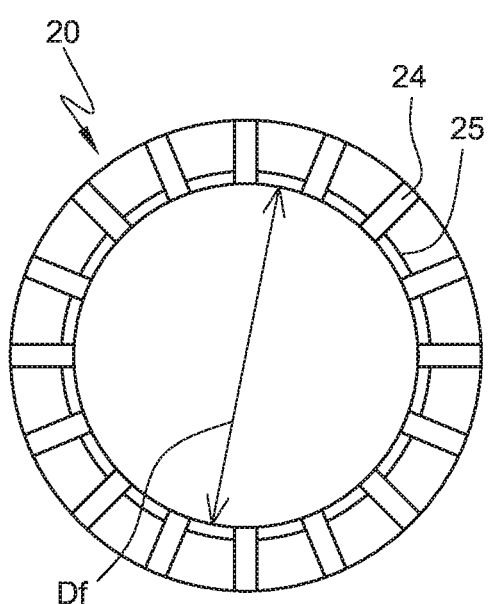
FIG. 5F is a schematic cross-sectional view of the downstream section of the nacelle fairing shown in the diverging position.

As described above, the axial displacement of the first annular element 25 is shown in FIGS. 5E and 5F, which varies the inner diameter of the first annular element 25. For example, the diameter Dc of the first annular element 25 is maximum when the downstream section of the fairing is in the convergent position (FIG. 5E), and the diameter Dc of the first annular element 25 is minimum when the downstream section of the fairing is in the divergent position (FIG. 5F). Thus, the first annular element 25 has a diameter Dc in the convergent position, which is greater than the diameter Df of the first annular element 25 in the divergent position.

When the actuator mechanism 23 with cylinder is actuated so as to retract the cylinder arm 23', the elements described above move in the opposite direction tending to decrease the diameter of the output section BF. Since the radially inner wall 20a and the radially outer wall 20b of the downstream section 20 are made of shape memory material, this has the effect of causing the downstream section 20 of the nacelle fairing 3 to return to the convergent configuration as shown in FIG. 5A.

In some embodiments, each annular row comprises at least four prisms 24, 24' distributed azimuthally equidistantly along the radially inner surface 20b' of the radially outer wall 20b of the downstream section 20. It is easy to understand that a high number of prisms will allow a better distribution of the radial thrusts and thus keep a more axisymmetrical shape of the downstream section 20 of the nacelle fairing 3 in a divergent position.

It could also be envisaged that each annular row of prisms 24, 24' could be connected to its own mechanism with cylinder 23 by an annular element, the propulsion system 1, 1' then comprising as many actuator mechanisms 23 with cylinder as annular rows of prisms 24, independent of one another.

According to another example embodiment, annular rings are directly connected to the cylinder arm 23' of each actuator mechanism 23. Each annular ring then slides directly on the inner surface 20b' of the outer wall 20b (converging at rest). In some embodiments, the inner surface 20b' of the outer wall 20b is then provided with an anti-friction coating.

Figure 2:
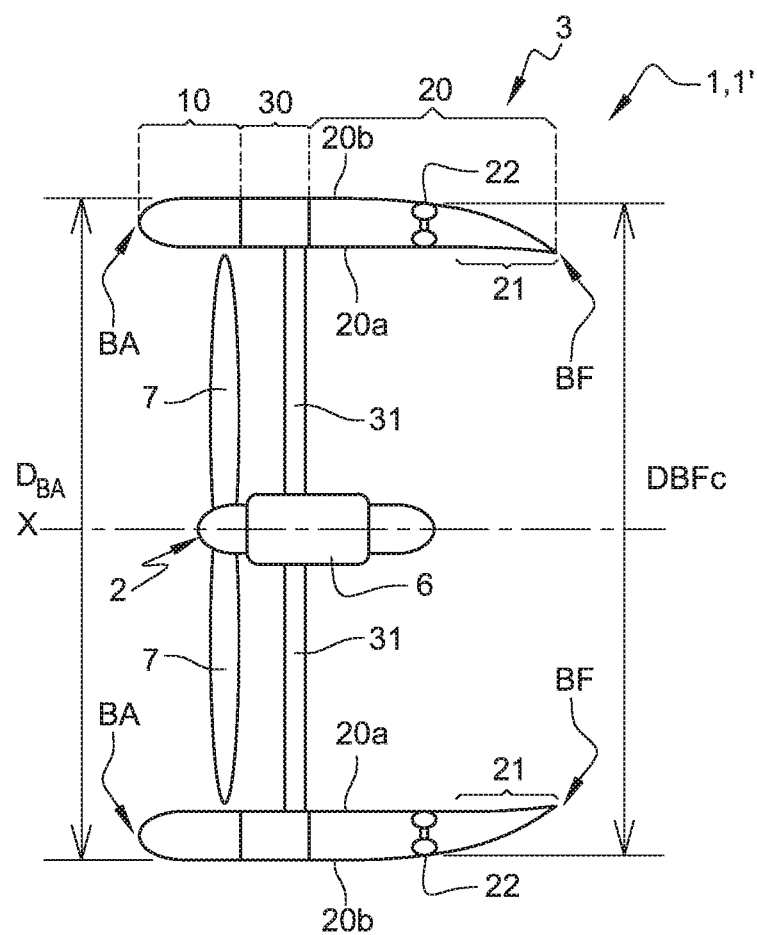
FIG. 2 is a schematic sectional view showing the propulsion system according to an embodiment of the disclosure with its downstream section of nacelle fairing in a convergent position.

FIG. 2 shows a propulsion system 1, 1' according to an embodiment of the disclosure, the downstream section 20 of the nacelle fairing 3 of which is shown in a convergent configuration corresponding to a position in which the cylinder arm 23' of the actuator mechanism 23 is fully retracted.

Figure 3:
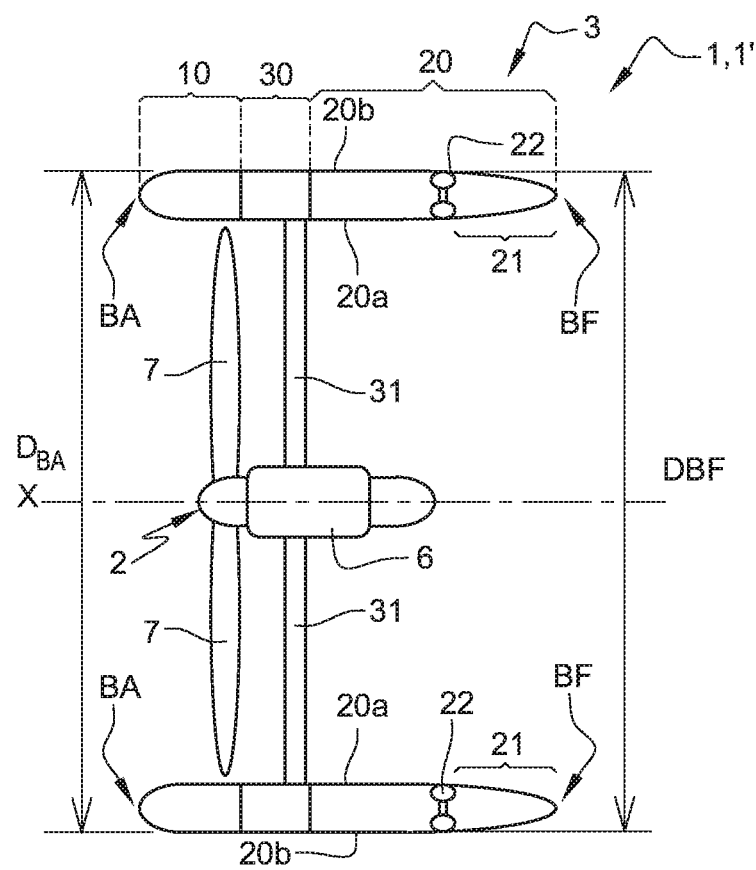
FIG. 3 is a view analogous to FIG. 2 showing the propulsion system according to an embodiment of the disclosure with its downstream section of nacelle fairing in an intermediate position.

FIG. 3 represents a propulsion system 1, 1' according to an embodiment of the disclosure whose downstream section 20 of the nacelle fairing 3 is shown in an intermediate position between the convergent configuration and the divergent configuration corresponding to a position in which the cylinder arm 23' of the actuator mechanism 23 is being extended.

Figure 4:
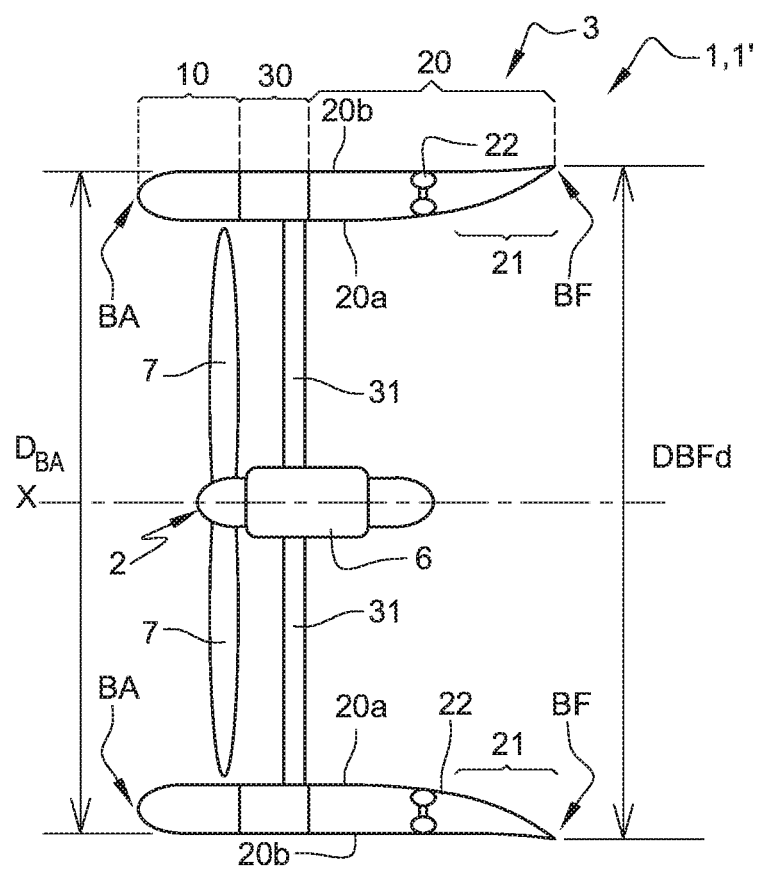
FIG. 4 is a view analogous to FIG. 2 showing the propulsion system according to an embodiment of the disclosure with its downstream section of nacelle fairing in a divergent position.

FIG. 4 represents a propulsion system 1, 1' according to an embodiment of the disclosure, the downstream section 20 of the nacelle fairing 3 of which is shown in a divergent configuration corresponding to a position in which the cylinder arm 23' of the actuator mechanism 23 is fully extended.

Indeed, the progressive displacement in extension of the cylinder arm 23' of the actuator mechanism 23 causes the progressive radially outer displacement of the means 24, 24' embedded in an inner surface 20b' of the radially outer wall 20b which deforms the radially inner wall 20a and radially outer wall 20b made of deformable material with shape memory of the downstream section 20 and, consequently, varies the outer diameter $D_{BF}$ of the outlet section BF from a minimum diameter $D_{BFc}$ in the converging configuration as shown in FIG. 2 to a maximum diameter $D_{BFd}$ in the diverging configuration of the downstream section 20 of the nacelle fairing 3 as shown in FIG. 4, passing through an intermediate position as shown in FIG. 3.

Similarly, the progressive contractive movement of the cylinder arm 23' of actuator mechanism 23 moves the nacelle fairing 3 from a divergent configuration as shown in FIG. 4 to a convergent configuration as shown in FIG. 2.

The transition from the convergent configuration to the divergent configuration of the downstream section 20 of the nacelle fairing 3, and vice versa, takes place continuously as a function of the extension or retraction of the cylinder arm 23' of the actuator mechanism 23, the stiffening bridges 22 ensuring a substantially constant distance between the radially inner wall 20a and the radially outer wall 20b of the downstream section 20 when the configuration of the outlet section BF (i.e. the trailing edge) of the nacelle fairing 3 is changed.

Thus, the aerodynamic profile of the inlet section and the outlet section of the nacelle fairing 3 can advantageously be optimized as a function of the aerodynamic and mechanical stresses sought according to the operating phase of the aircraft, between a divergent or convergent configuration to form, respectively, on its periphery, a divergent or convergent flow tube.

Embodiments of the propulsion system 1, 1' thus make it possible to benefit in a simple and rapid manner, according to the needs of the aircraft, from a convergent or divergent downstream section 20 of nacelle fairing 3 of rotors 2. The nacelle fairing 3 of the propulsion system 1, 1' according to the disclosure thus makes it possible, by its shape, its construction and the materials of which it is made, to act as an acoustic screen against the noise emanating from the rotation of the rotors 2, guaranteeing better attenuation of acoustic emissions but also increased safety of the rotors 2 with respect to possible surrounding obstacles while benefiting from the thrust effect of the nacelle fairing 3 of the propulsion system 1, 1' useful in hovering flight or at low forward speed.

Thus, an aircraft equipped with a propulsion system 1, 1' according to the disclosure has the interesting advantage of being able to have, according to the needs, a downstream section of divergent or convergent rotor nacelle fairing 3, the section of the nacelle fairing 3 varying according to the flight conditions of the aircraft and the propulsion performance requirements of the latter, for optimal aerodynamic performance of the aircraft. When the aircraft is in a phase of flight at a relatively high forward speed, the downstream section 20 of the nacelle fairing 3 is in a convergent position. When the aircraft is taking off or when the aircraft is in a vertical flight phase over a surface and ground effects are significant, the downstream section 20 of the nacelle fairing 3 is in a divergent position.

In addition, the ability to also vary the outer diameter $D_{BA}$ of the inlet section BA (or leading edge) of the nacelle fairing 3 between a neutral position and a converging position further enhances the aerodynamic performance of the aircraft.

Indeed, the combination of variations in the inlet and outlet sections allows the airflow duct of the rotor propulsion system to be modified, thereby significantly improving the aerodynamic performance of the aircraft.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A propulsion system for an aircraft, having at least one rotor and a nacelle fairing extending around said at least one rotor with respect to an axis of rotation of said rotor, the nacelle fairing comprising:
   an upstream section forming an inlet section of the nacelle fairing;
   a downstream section wherein a downstream end forms an outlet section of the nacelle fairing; and
   an intermediate section connecting said upstream and downstream sections;
   wherein the downstream section comprises a radially inner wall and a radially outer wall made of a deformable shape-memory material, and wherein the downstream section comprises at least one actuator mechanism with at least one cylinder configured to cooperate with means embedded in an inner surface of the radially outer wall so as to vary an outer diameter of the outlet section between a determined minimum diameter and determined maximum diameter.

2. The propulsion system according to claim 1, wherein the means embedded in the inner surface of the radially outer wall comprise a plurality of prisms distributed in at least one annular row, this plurality of prisms being actuated by said at least one cylinder via at least one annular element.

3. The propulsion system according to claim 1, wherein the system further comprising stiffening bridges connecting the radially inner and radially outer walls of the downstream section.

4. The propulsion system according to claim 1, wherein the intermediate section is rigid and is connected by at least one arm to a motor of the propulsion system.

5. The propulsion system according to claim 1, wherein the upstream section is made of a deformable shape-memory material, this upstream section comprising means for varying an outer diameter of the inlet section.

6. The propulsion system according to claim 5, wherein the outer diameter of the inlet section varies under the effect of a pneumatic or hydraulic expansion device.

7. The propulsion system according to claim 5, wherein the outer diameter of the inlet section varies under the effect of a heating annular coating, the upstream section still having heat-shrinkable characteristics.

8. The propulsion system according to claim 5, wherein the outer diameter of the inlet section varies under the effect of an actuator mechanism with cylinder configured to cooperate with means integral with an inner surface of a radially outer wall of the upstream section.

9. The propulsion system according to claim 5, wherein the outer diameter of the inlet section varies under the effect of a pneumatic or hydraulic annular actuator configured to deform radially under the effect of a predetermined control pressure.

10. The propulsion system according to claim 1, wherein the upstream section comprises stiffeners connected by an anti-buckling device.

11. An aircraft, comprising at least one propulsion system according to claim 1, the propulsion system being mounted so as to pivot on the aircraft by a pivot shaft which is offset or through with respect to the rotor.

* * * * *